(12) United States Patent
Fischer

(10) Patent No.: US 8,517,420 B2
(45) Date of Patent: Aug. 27, 2013

(54) DISCHARGE ORIFICE FOR AIRBAG INFLATOR

(75) Inventor: Christopher K. Fischer, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 308 days.

(21) Appl. No.: 12/968,517

(22) Filed: Dec. 15, 2010

(65) Prior Publication Data
US 2012/0153602 A1   Jun. 21, 2012

(51) Int. Cl.
*B60R 21/26* (2011.01)
(52) U.S. Cl.
USPC .......................................... 280/736; 280/741
(58) Field of Classification Search
USPC .......................................... 280/736, 741, 742
See application file for complete search history.

(56) References Cited

U.S. PATENT DOCUMENTS

| | | | |
|---|---|---|---|
| 5,388,859 A | | 2/1995 | Fischer et al. |
| 5,618,057 A | * | 4/1997 | Johnson et al. ............... 280/736 |
| 5,772,243 A | | 6/1998 | Green et al. |
| 7,938,443 B1 | * | 5/2011 | Smith ........................... 280/736 |

FOREIGN PATENT DOCUMENTS

| | | |
|---|---|---|
| JP | 2004-66920 | 3/2004 |
| WO | WO-2008/140441 A1 | 11/2008 |

* cited by examiner

*Primary Examiner* — Paul N Dickson
*Assistant Examiner* — Timothy Wilhelm
(74) *Attorney, Agent, or Firm* — Madson IP, P.C.

(57) ABSTRACT

A primary gas flow aperture communicates between upstream and the downstream sides of a bulkhead securable across an inflator discharge passageway, accommodating some inflation gas flow through the passageway. A deformable flow control panel peripherally secured on the downstream side of the bulkhead has a closure portion obscuring some inflation gas flow past the bulkhead. Pressure of the inflation gas on the closure portion deforms the control panel away from the bulkhead. A primary gas flow window through the flow control panel overlies all or some of the primary gas flow aperture. When the primary gas flow window is larger than or equal to the primary gas flow aperture, supplemental gas flow apertures are formed through the bulkhead separated from the primary gas flow aperture. Otherwise, supplemental gas flow windows are formed through the flow control panel separated from the primary gas flow window.

19 Claims, 8 Drawing Sheets

DISCHARGE ORIFICE FOR AIRBAG INFLATOR

BACKGROUND OF THE INVENTION

1. Field of the Invention

The present invention relates to vehicle passenger safety modules that use pressurized gas from an inflator to deploy an airbag between passengers and the interior of a vehicle in the event of a collision. The present invention pertains to such an inflator and, with more particularity, to the discharge orifice for pressurized inflation gas produced in the gas generation chamber of that inflator.

2. Background

An airbag for a vehicle passenger safety module includes an inflation portion that captures pressurized gas from an inflator, thereby becoming a gas-filled cushion interposed between a vehicle occupant and the interior vehicle surfaces surrounding that occupant.

Typically, the inflator is ignited electrically in response to a momentum monitor carried in the vehicle. The inflator is a structure having walls sufficiently sturdy to safely retain inflation gas at high pressures and to direct the pressurized inflation gas therefrom in directions and in quantities that are optimally suited to nondestructively, but efficiently, inflate an airbag cushion. The pressurized inflation gas is produced in an internal gas generation chamber of the inflator as a result of a single or a series of extremely rapid reactions. The pressurized inflation gas flows from the gas generation chamber through a discharge passageway to the exterior of the inflator.

The temperatures and the combustion pressures arising in the gas generation chamber depend on the properties of the various materials employed inside the gas generation chamber to produce pressurized inflation gas. Singular chemical reactions of modest quantities of medium energy materials give rise to modest combustion pressures and low temperatures in the gas generation chamber, which in turn generally result in a low volume production of inflation gas. Low volume inflation gas production may be appropriate in view of the location and the intended function of the airbag into which the inflation gas is to be directed.

On the other hand, conditions may exist in which the production of a high volume of pressurized inflation gas is a necessity to fully implement intended passenger safety measures through the inflation of, for example, larger airbags. In such circumstances, a plurality of reactions may be conducted in the inflator involving major quantities of high energy materials. Then the temperatures and combustion pressures produced in the gas generation chamber of the inflator can become extreme.

Pressurized inflation gas from the gas generation chamber of an inflator flows through a discharge passageway to the exterior of the inflator. A discharge orifice is located in the discharge passageway in order to establish, for pressurized inflation gas leaving the gas generation chamber, an effective outflow cross section that is suited to conditions anticipated in the gas generation chamber.

BRIEF SUMMARY OF THE INVENTION

A discharge orifice having fixed dimensions is unable to adapt to changes in the flow of pressurized inflation gas in the discharge passageway, thereby to compensate for increases in the temperatures and the combustion pressures produced in the gas generation chamber. This is the case even during a single-stage reaction in the gas generation chamber. In a multiple-stage series of reactions, the variation in the temperature and combustion pressure arising in a gas generation chamber can be quite substantial.

Thus, in an inflator, when a discharge orifice of fixed dimension is tuned with the intention of maintaining a desired combustion pressure under specified temperature conditions during the high volume inflation gas production that occurs in a multiple-stage series of reactions, the discharge orifice will be too large to maintain the desired combustion pressure when the inflator is used under lower temperature conditions in, for example, a single-stage reaction or an initial period of a multiple-stage series of reactions. On the other hand, if a discharge orifice of fixed dimension is sized to maintain a desired combustion pressure for a single-stage reaction under lower temperature conditions, the discharge orifice will be insufficient in size to permit sufficiently rapid pressurized inflation gas outflow during conditions of high volume inflation gas production and higher temperatures. This could cause combustion pressures in the gas generation chamber to exceed the structural limits of the inflator.

Accordingly, it is an object of the present invention to decrease the difference arising in a gas generation chamber between the lower temperature, single-stage reactions associated with low volume inflation gas production and the higher temperature, multiple-stage reactions required for high volume inflation gas production. The inventive gas discharge orifice and the methods associated therewith address the temperatures and output-induced pressure differentials arising in the gas generation chamber of an inflator of a vehicle passenger safety module. These differentials are particularly challenging in the case of multiple-stage reaction, high volume pressurized inflation gas production.

Each embodiment of the inventive discharge orifice disclosed herein controls combustion pressures arising upstream therefrom by deforming a control surface and thereby exposing additional cross-sectional flow areas through the discharge orifice. The control surface is carried on a deformable flow control panel. Under normal temperatures or in single-stage reactions, the control panel remains in a disposition that limits the flow of pressurized inflation gas through the discharge orifice to a single low-flow effective outflow cross section. When the combustion pressure upstream of the discharge orifice increases due, either to temperature, pressure, or inflation gas output, the flow control panel is deformed in such a manner as to open to the flow of pressurized inflation gas additional amounts of effective outflow cross section.

Accordingly, a gas discharge orifice incorporating teachings of the present invention includes a continuous open frame securable within the discharge passageway circumscribing the flow of inflation gas therethrough and an inflation gas flow control valve filling the frame. The flow control valve operates from an open first condition thereof into an open second condition thereof responsive to the development of combustion pressure in the gas generation chamber greater than a predetermined threshold combustion pressure. The first condition of the flow control valve presents to the flow of inflation gas through the discharge passageway a first effective outflow cross section that is tuned to low volume inflation gas production in the gas generation chamber, while the second condition of the flow control valve presents to the flow of inflation gas in the discharge passageway a second effective outflow cross section that is greater than the first effective outflow cross section and that is tuned to high volume inflation gas production in the gas generation chamber. In this manner, the flow control valve moderates the difference between the combustion pressure arising in the gas generation chamber during low volume inflation gas production and the combustion pressure arising in the gas generation chamber during high volume inflation gas production. Operation of the flow control valve from the first condition thereof into the second condition thereof may be configured to be irreversible.

In one aspect of the present invention, an embodiment of the flow control valve includes a rigid bulkhead that is peripherally secured to the frame and that has an upstream side directed toward the gas generation chamber when the frame of the gas discharge orifice is secured in the discharge passageway, and a downstream side opposite therefrom. A primary gas flow aperture is formed through the bulkhead communicating between the upstream side and the down stream side thereof. A portion of the primary gas flow aperture accommodates a flow of inflation gas through the flow control valve in both the first condition and the second condition thereof. A deformable flow control panel is peripherally secured to the frame adjacent to and on the downstream side of the bulkhead. In the first condition of the flow control valve the control panel contacts the bulkhead with a closure portion of the control panel obscuring a portion of the primary gas flow aperture. The control panel is urged out of contact with the bulkhead into the second condition of the flow control valve by pressure exerted by inflation gas through the through the primary gas flow aperture against the closure portion of the control panel. The primary gas flow aperture defines the second effective outflow cross section presented to the flow of inflation gas in the second condition of the flow control valve.

A primary gas flow window is formed through the flow control panel. In the first condition of the flow control valve, the primary gas flow window overlies a portion of the primary gas flow aperture in the bulkhead. The primary gas flow window is smaller in cross section than the primary gas flow aperture. A plurality of supplemental gas flow windows are formed through the flow control panel at locations radially separated from the primary gas flow window. In the second condition of the flow control valve the supplemental gas flow windows contribute to defining the second effective outflow cross section presented to the flow of inflation gas.

In an alternative embodiment of the flow control valve, the entire primary gas flow aperture accommodates a flow of inflation gas through the flow control valve in both the first condition and the second condition thereof, and a relief aperture is formed through the bulkhead at a location separated from the primary gas flow aperture. A deformable flow control panel is peripherally secured to the frame adjacent to and on the downstream side of the bulkhead. In the first condition of the flow control valve the control panel contacts the bulkhead with a closure portion of the control panel obscuring the relief aperture. The control panel is urged out of contact with the bulkhead into the second condition of the flow control valve by pressure exerted by inflation gas through the relief aperture against the closure portion of the control panel. The primary gas flow aperture defines the first effective outflow cross section presented to the flow of inflation gas in the first condition of the flow control valve. In the second condition of the flow control valve the relief aperture contributes to defining the second effective outflow cross section presented to the flow of inflation gas. A primary gas flow window is formed through the flow control panel. The gas flow window is larger in cross section than the primary gas flow aperture in the bulkhead. In the first condition of the flow control valve a portion of the primary gas flow window is overlapped by the primary gas flow aperture.

In yet another embodiment of the flow control valve, a deformable flow control panel is peripherally secured to the frame. The flow control panel has an upstream side directed toward the gas generation chamber, when the frame is secured in the discharge passageway, and a downstream side opposite therefrom. In the first condition of the flow control valve the upstream side of the flow control panel is crimped into engagement with itself in a folded region of the flow control panel. The folded region is concentric with the primary gas flow window. A primary gas flow window is formed through the flow control panel at a central location. The primary gas flow window defines the first effective outflow cross section presented to the flow of inflation gas in the first condition of the flow control valve. A plurality of supplemental gas flow windows are formed through the folded region of the flow control panel. In the first condition of the flow control valve the supplemental gas flow windows are obscured by the crimping of the flow control panel upon itself, while in the second condition of the flow control valve the control panel is urged by the pressure of inflation gas against the upstream side of the flow control panel to uncrimp the folded region of the flow control panel and open the supplemental gas flow windows.

According to another aspect of the present invention, a gas discharge orifice for a vehicle safety airbag inflator includes a rigid bulkhead that is peripherally securable across the discharge passageway and that has an upstream side directed toward the gas generation chamber, when the bulkhead is secured in the discharge passageway, and a downstream side opposite therefrom. A primary gas flow aperture is formed through the bulkhead communicating between the upstream side and the down stream side thereof. At least a portion of the primary gas flow aperture accommodates a flow of inflation gas through the gas discharge orifice on all occasions. A deformable flow control panel is peripherally secured to the bulkhead on the downstream side thereof. The control panel contacts the bulkhead with a closure portion of the control panel obscuring inflation gas flow past the bulkhead, but the control panel is urged out of contact with the bulkhead by pressure exerted by inflation gas through the bulkhead against the closure portion of the control panel.

A primary gas flow window is formed through the flow control panel overlying at least a portion of the primary gas flow aperture in the bulkhead, and a plurality of supplemental gas flow windows are formed through the flow control panel at locations radially separated from the primary gas flow window. The primary gas flow window may be smaller in cross section than the primary gas flow aperture in the bulkhead.

Alternatively, the primary gas flow window in the flow control panel is larger in cross section than the primary gas flow aperture in the bulkhead, and a plurality of relief apertures is formed through the bulkhead at a locations radially separated from the primary gas flow aperture.

The present invention also includes methods for moderating the difference between the combustion pressure in the gas generation chamber of a vehicle safety airbag inflator during low volume inflation gas production and the combustion pressure in the gas generation chamber during high volume inflation gas production.

One embodiment of such a method includes determining a predetermined threshold combustion pressure above which the combustion pressure arising in the gas generation chamber ceases to correspond to low volume inflation gas production and sensing the combustion pressure in the gas generation chamber from a location in the discharge passageway. The effective gas outflow cross section of the discharge passageway is then sized in the following manner. When the combustion pressure is less than the predetermined threshold combustion pressure, the flow of inflation gas through the discharge passageway is presented with a first effective gas outflow cross section that is tuned to low volume inflation gas production; and when the combustion pressure is greater than or equal to the predetermined threshold combustion pressure, the flow of inflation gas in the discharge passageway is presented with a second effective gas outflow cross section that is greater than the first effective gas outflow cross section and that is tuned to high volume inflation gas production.

Sensing the existing combustion pressure in the gas generation chamber from a location in the discharge passageway involves forming centrally through a deformable, substantially planar flow control panel a primary gas flow window, and securing the flow control panel across the discharge passageway. The flow control panel is deformable downstream within the flow of inflation gas in the discharge passageway during high volume inflation gas production. Sizing effective gas outflow cross section of the discharge passageway involves producing a primary gas flow aperture centrally through a rigid bulkhead, disposing the bulkhead in the discharge passageway upstream of and in parallel face-to-face abutment with the flow control panel with the primary gas flow aperture in fluid-flow alignment with the primary gas flow window, and rendering the primary gas flow aperture unequal in size to the primary gas flow window. The cross-sectional area of the smaller of the primary gas flow aperture and the primary gas flow window corresponds to the first effective gas outflow cross section. The step of sensing concludes by creating a plurality of relief openings through the one of the bulkhead and the flow control panel associated with the smaller of the primary gas flow aperture and the primary gas flow window, doing so in such a manner that the total of the cross-sectional areas of the relief openings combine with the cross-sectional area of the smaller of the primary gas flow aperture and the primary gas flow window to correspond to the second effective gas outflow cross section.

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof which are illustrated in the appended drawings. Understanding that these drawings depict only typical embodiments of the present invention and are not therefore to be considered to be limiting of the scope thereof, the present invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the apparatus of present invention, as generally described and illustrated in the figures herein, could be arranged and designed in a wide variety of different configurations, and that the steps of the methods of the present invention could be performed in diverse manners and in various orders. Thus, the following more detailed description of the embodiments of the present invention, as represented in FIGS. 1-11, is not intended to limit the scope of the invention, as claimed, but is merely representative of selected embodiments of the invention.

Figure 1:
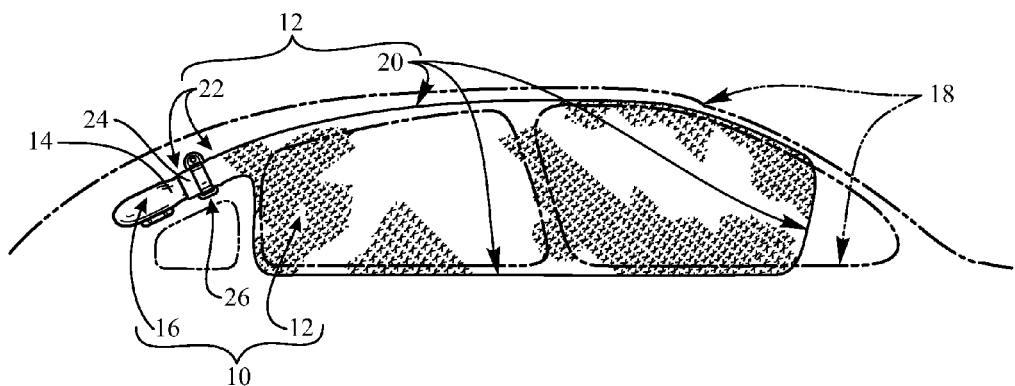
FIG. 1 is an elevation view, superimposed against a profile in phantom of a side window of a typical passenger vehicle, of an inflated curtain airbag for a vehicle passenger safety module that is attached to the discharge end of an inflator incorporating teachings of the present invention.

FIG. 1 is an elevation view of a vehicle passenger safety module 10 that includes a curtain airbag 12 communicating with a discharge end 14 of an inflator 16. Although for illustrative purposes, FIG. 1 shows a curtain airbag, persons of skill in the art will understand that the advantages of the present invention can also be adapted and used with other types of airbags. Pressurized inflation gas with which to deploy airbag 12 is produced in a gas generation chamber within inflator 16 and flows therefrom through a discharge passageway to discharge end 14 of inflator 16. While neither the gas generation chamber nor the discharge passageway of inflator 16 is visible in FIG. 1, these structures do appear in subsequent drawings.

Inflator 16 incorporates teachings of the present invention by including a discharge orifice that is also not visible in FIG. 1. The inventive discharge orifice moderates the difference between the combustion pressure in the gas generation chamber of inflator 16 during low volume inflation gas production and the combustion pressure in the gas generation chamber during high volume inflation gas production. Pressurized inflation gas from the gas generation chamber flows through the discharge passageway to the exterior of inflator 16 and is released from discharge end 14 of inflator 16 for passage into airbag 12. For perspective, these elements of safety module 10 are superimposed against a profile in phantom of a side of a typical passenger vehicle 18. Airbag 12 includes an inflation portion 20 that becomes a protective cushion by capturing pressurized inflation gas from inflator 14, and a sleeve-like inlet portion 22 that communicates inflation gas into inflation portion 20. The open end 24 of inlet portion 22 of inflator 12 has been advanced over discharge end 14 of inflator 16 and secured thereabout by an attachment bracket 26.

Figure 2:
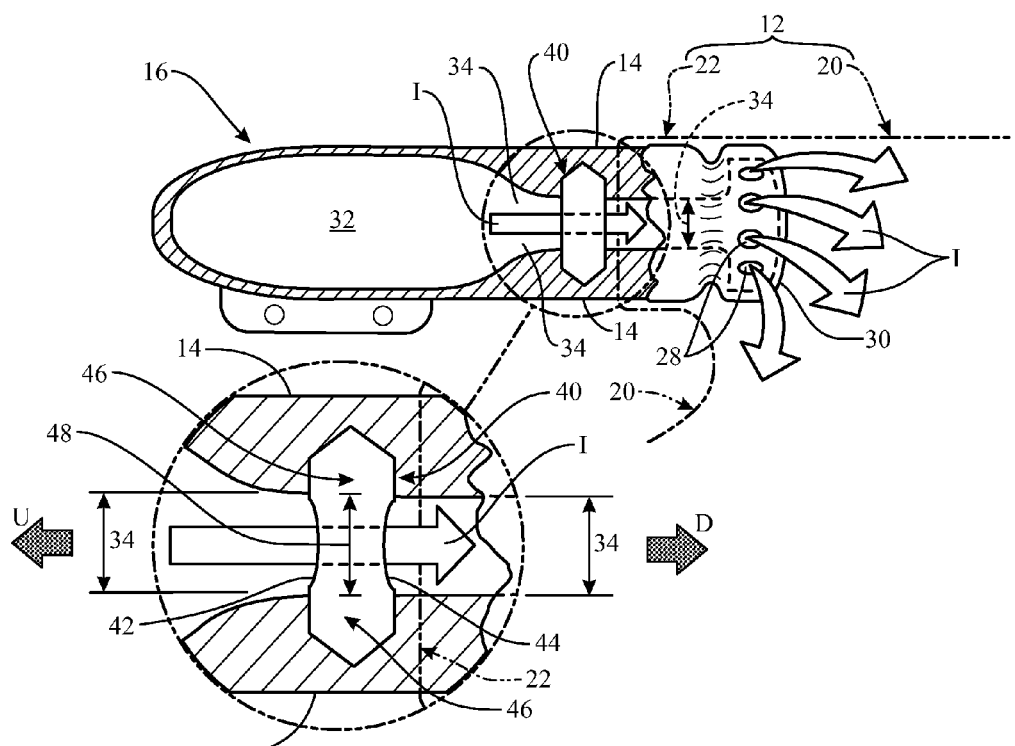
FIG. 2 is an enlarged view in partial cross section of the inflator of FIG. 1 showing the combustion chamber and the discharge passageway thereof and depicting in diagrammatic manner the relationship to those structures of a first embodiment of a discharge orifice incorporating teachings of the present invention.

FIG. 2 is an enlarged view in partial cross section of inflator 16 in FIG. 1. Discharge end 14 of inflator 16 is inserted into inlet portion 22 of airbag 12, which is drawn in phantom. Attachment bracket 26 has been omitted to improve comprehension. Pressurized inflation gas I can be seen to be entering airbag 12 through a plurality of egress apertures 28 radially disposed about the distal tip 30 of discharge end 14 of inflator 16.

Pressurized inflation gas I is produced in a gas generation chamber 32 interior of inflator 16 and communicated therefrom to egress apertures 28 through a discharge passageway 34. Mounted within and across discharge passageway 34 is a discharge orifice 40 for inflator 16 that incorporates teachings of the present invention. Accordingly, discharge orifice 40 moderates the difference between the combustion pressure in gas generation chamber 32 during low volume inflation gas production and the combustion pressure in gas generation chamber 32 during high volume inflation gas production. By so doing, discharge orifice 40 serves to raise the combustion pressure in gas generation chamber 32 during low volume inflation gas production and lower the combustion pressure in gas generation chamber 32 during high volume inflation gas production.

The attainment of this advantageous result will be explored, initially in general terms by reference to discharge orifice 40 in the enlarged inset associated with FIG. 2. Thereafter, that achievement will be discussed with more specificity in relation to a plurality of embodiments of discharge orifices incorporating teachings of the present invention that are depicted in subsequent figures.

The flow of pressurized inflation gas I within discharge passageway 34 establishes a directional frame of reference within inflator 16. Thus, gas generation chamber 32 is upstream in the flow of pressurized inflation gas I from discharge passageway 34, upstream direction U being indicated by an arrow directed to the left adjacent to the inset of FIG. 2. On the other hand, egress apertures 28 are located downstream in the flow of pressurized inflation gas I from discharge passageway 34 and gas generation chamber 32, downstream direction D being indicated by an arrow directed to the right adjacent to the inset of FIG. 2. Discharge orifice 40 is depicted in the inset associated with FIG. 2 as being positioned along the course of discharge passageway 34. Thus, discharge orifice 40 has an upstream side 42 oriented toward gas generation chamber 32 and a downstream side 44 oriented oppositely therefrom.

Broadly, discharge orifice 40 includes a continuous open frame 46 that is securable within discharge passageway 34 circumscribing the flow of pressurized inflation gas I therethrough. An inflation gas flow control valve 48 fills frame 46 between upstream side 42 and downstream side 44 of discharge orifice 40. Flow control valve 48 operates irreversibly from an open first condition thereof into an open second condition thereof in response to the development of a combustion pressure $P_{32}$ in gas generation chamber 32 that is greater than predetermined threshold combustion pressure $P_T$. The development of a combustion pressure $P_{32}$ that is greater than a predetermined threshold combustion pressure $P_T$ is detected within discharge passageway 34 by the structures of flow control valve 48, rather than within gas generation chamber 32.

In the first condition of flow control valve 48, pressurized inflation gas I passing through discharge passageway 34 is presented with a first effective outflow cross section that is tuned to low volume inflation gas production in gas generation chamber 32. The effective outflow cross section in discharge passageway 34 is restricted by flow control valve 48 to a relatively small effective outflow cross section. This in turn increases the back pressure maintained in upstream direction U toward and inside gas generation chamber 32, increasing the speed of the development of higher combustion pressures there.

In the second condition of control valve 48, the flow of inflation gas I in discharge passageway 34 is presented with a second effective outflow cross section that is greater than the first effective outflow cross section and is tuned to high volume inflation gas production in gas generation chamber 32. Both the first condition and the second condition of flow control valve 48 are open to the passage of some pressurized inflation gas I therethrough on all occasions, but in the first condition the effective outflow cross section presented to the passage of pressurized inflation gas I is less than the effective outflow cross section presented to the passage of pressurized inflation gas I in the second condition.

Flow control valve 40 may accordingly be viewed as an ever-open relief valve that increases the effective outflow cross section presented to the passage of pressurized inflation gas I, and correspondingly reduces the back pressure maintained upstream toward and inside gas generation chamber 32, when the combustion pressure $P_{32}$ in gas generation chamber 32 begins to surpass predetermined threshold combustion pressure $P_T$. The reduction of back pressure is suited to increasing the outflow volume of pressurized inflation gas I through discharge passageway 34, a condition appropriate to high volume inflation gas production. In this light, predetermined threshold combustion pressure $P_T$ is chosen to equal a combustion pressure above which conditions in gas generation chamber 32 cease to correspond to those associated with low volume inflation gas production.

Figure 3:
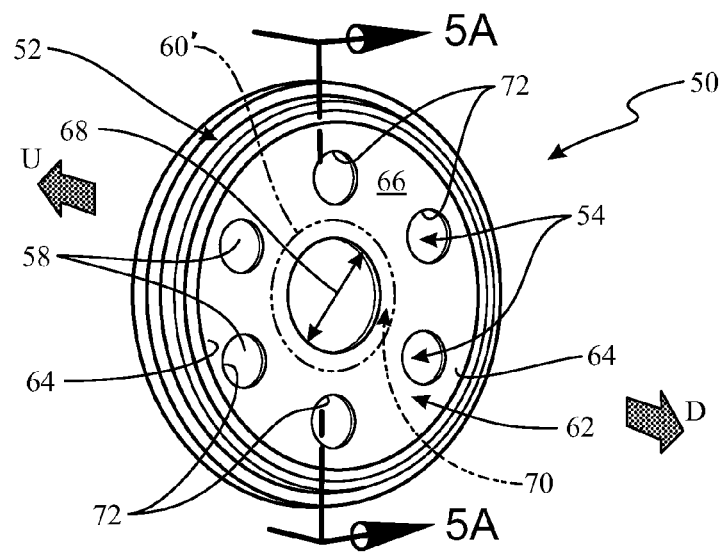
FIG. 3 is a perspective view of a second embodiment of a discharge orifice incorporating teachings of the present invention.
Figure 4:
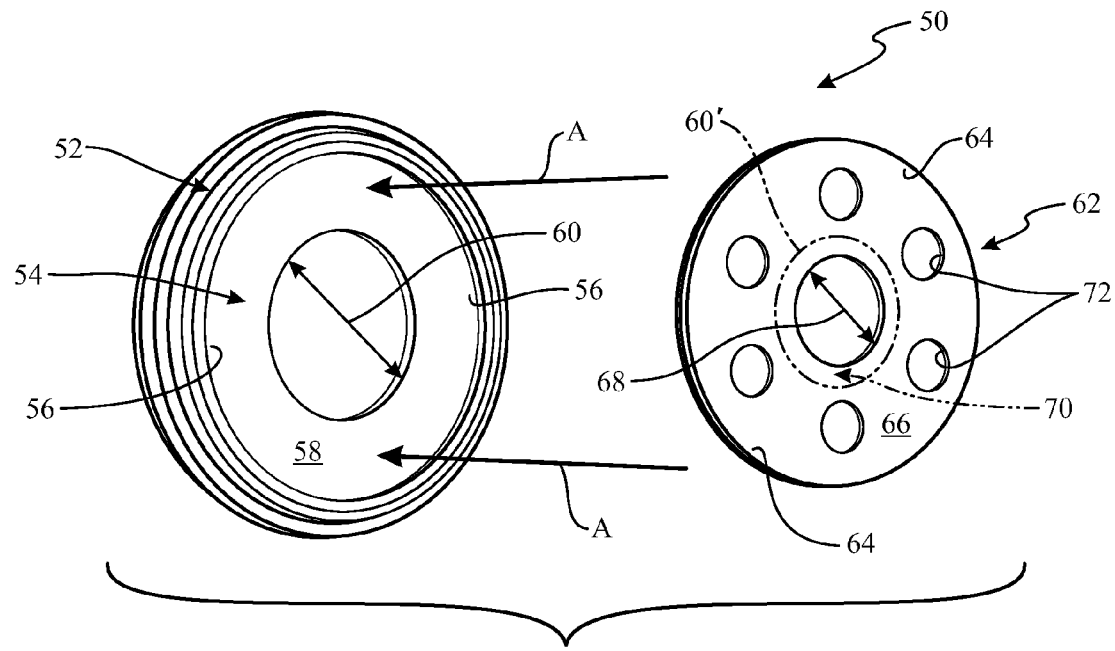
FIG. 4 is a disassembled perspective view of the discharge orifice of FIG. 3.

FIG. 3 is a perspective view of a second embodiment of a discharge orifice 50 incorporating teachings of the present invention, while FIG. 4 is a disassembled perspective view of the elements of discharge orifice 50. Upstream direction U and downstream direction D are shown by arrows. In FIGS. 3 and 4 only the downstream sides of the depicted structures are visible. The upstream sides of those structures are presented subsequently in discussing the operation of discharge orifice 50.

Discharge orifice 50 includes a continuous open frame 52 that is intended to be secured within discharge passageway 34 circumscribing the flow of pressurized inflation gas I therethrough. A rigid, plate-like bulkhead 54 is secured about the periphery 56 thereof within frame 52. Bulkhead 54 has an upstream side that is directed toward gas generation chamber 32 when frame 52 with bulkhead 54 carried therein is secured in discharge passageway 34 in the manner of discharge orifice 40 in FIG. 2. Opposite therefrom bulkhead 54 has a downstream side 58 that is visible in FIGS. 3 and 4.

A primary gas flow aperture 60 is formed through bulkhead 54 communicating between downstream side 58 and the upstream side thereof. Primary gas flow aperture 60 as seen to best advantage in FIG. 4 is a circular opening centrally located within bulkhead 54. Nonetheless, alternative configurations are possible of a primary gas flow aperture through a bulkhead, such as bulkhead 54. As will be borne out subsequently in an exploration of the operation of discharge orifice 50, a portion of primary gas flow aperture 60 accommodates some flow of pressurized inflation gas I through discharge orifice 50 on all occasions.

Discharge orifice 50 also includes a relatively thin, deformable flow control panel 62 that is secured by the periphery 64 thereof within frame 52. Flow control panel 62 has an upstream side that is directed toward gas generation chamber 32 when frame 52 carrying flow control panel 62 is secured in discharge passageway 34 in the manner of discharge orifice 40 in FIG. 2. Oppositely therefrom, flow control panel 62 has a downstream side 66. As suggested by the assembly arrows A in FIG. 4, when flow control panel 62 is carried in frame 52, the upstream side of flow control panel 62 is adjacent to and in contact with downstream side 58 of bulkhead 54. A primary gas flow window 68 is formed through flow control panel 62 communicating between downstream side 66 and the upstream side thereof. As illustrated in FIGS. 3 and 4, primary gas flow window 68 is a circular opening centrally formed through flow control panel 62. Nonetheless, alternative configurations are possible of a primary gas flow window through a flow control panel, such as control panel 62.

Primary gas flow window 68 in flow control panel 62 is smaller in cross-sectional area than is primary gas flow aperture 60 in bulkhead 54. When frame 52, bulkhead 54, and flow control panel 62 are assembled as shown in FIG. 3, primary gas flow aperture 60 of bulkhead 54 and primary gas flow window 68 of flow control panel 62 are concentrically aligned. In that condition, a closure portion 70 of flow control panel 62 adjacent to and circumscribing primary gas flow window 68 obscures a portion of primary gas flow aperture 60 in bulkhead 54. The location of primary gas flow aperture 60 behind and in abutment with flow control panel 62 is indicated in FIGS. 3 and 4 on downstream side 66 of flow control panel 62 in the form of a phantom primary flow aperture 60', which accordingly defines the radially outermost terminus of closure portion 70 of flow control panel 62.

A plurality of relatively small supplemental gas flow windows 72 are formed through flow control panel 62 uniformly circumferentially spaced about gas flow window 68 at equal radial distances therefrom. Nonetheless, alternative configurations are possible of supplemental gas flow windows 72 through a flow control panel, such as flow control panel 62. When flow control panel 62 and bulkhead 54 are assembled within frame 52, supplemental gas flow windows 72 are blocked by bulkhead 54. It is, for example, only through supplemental gas flow windows 72 that downstream side 58 of bulkhead 54 is visible in FIG. 3.

Figure 5A:
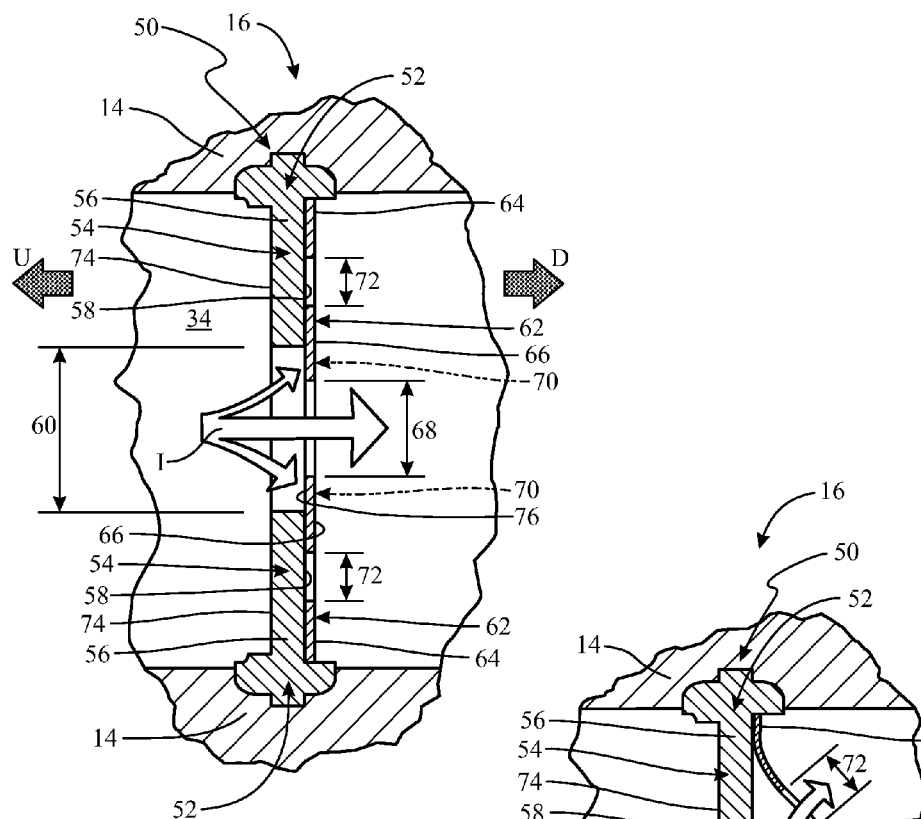
FIG. 5A is a elevation cross-sectional view of the discharge orifice of FIG. 3 taken along section line 5A-5A therein, thereby to depict the discharge orifice in an open first condition thereof wherein the discharge orifice presents to the flow of inflation gas through the discharge passageway a first effective outflow cross section tuned to low volume inflation gas production.

FIG. 5A is a cross-sectional elevation view of discharge orifice 50 from FIG. 3 disposed in discharge passageway 34 within discharge end 14 of inflator 16 in the manner of discharge orifice 40 in FIG. 2. Accordingly, FIG. 5A depicts discharge orifice 50 in an open first condition thereof in which discharge orifice 50 presents to the flow of pressurized inflation gas I through discharge passageway 34 a first effective outflow cross section that is tuned to low volume inflation gas production. Frame 52 is lodged in discharge passageway 34. Periphery 56 of bulkhead 54 and periphery 64 of flow control panel 62 are secured within frame 52 traversing the flow of pressurized inflation gas I through discharge passageway 34. Downstream side 58 of bulkhead 54 is presented through supplemental gas flow window 72 in flow control panel 62, while the upstream side 74 of bulkhead 54 is oriented in upstream direction U, toward gas generation chamber 32.

Bulkhead 54 is disposed upstream of and in parallel face-to-face abutment with the upstream side 76 of flow control panel 62. Primary gas flow aperture 60 in bulkhead 54 is in fluid-flow alignment with primary gas flow window in flow control panel 62, but closure portion 70 of flow control panel 62 partially blocks the passage of pressurized inflation gas I through primary flow aperture 60. Accordingly, in the open first condition of discharge orifice 50, primary gas flow window 68 in flow control panel 62 defines the first effective outflow cross section presented to the flow of pressurized inflation gas I. As combustion pressure $P_{32}$ increases, the pressure exerted on upstream side 76 of closure portion 70 of flow control panel 62 also increases.

Figure 5B:
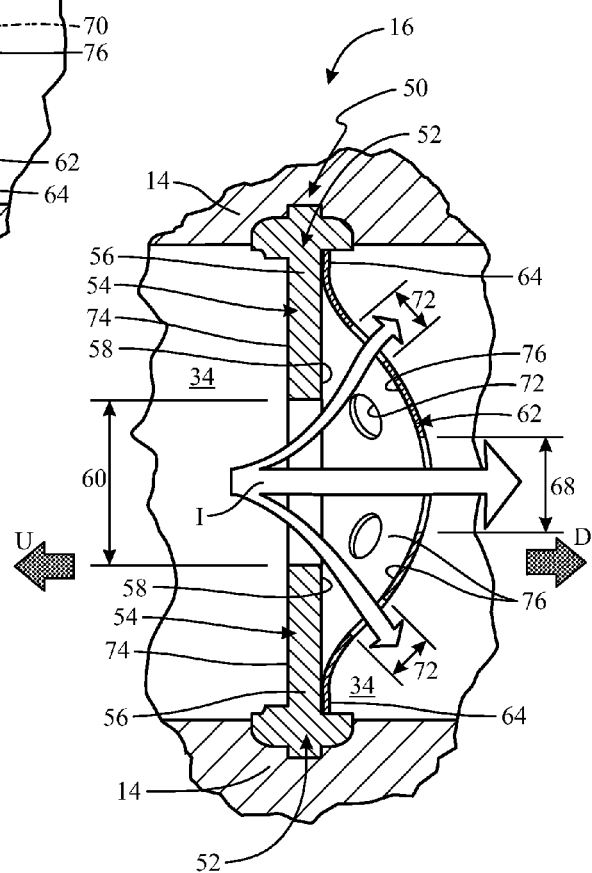
FIG. 5B is a elevation cross-sectional view of the discharge orifice of FIG. 5A in an open second condition thereof wherein the discharge orifice presents to the flow of inflation gas through the discharge passageway a second effective outflow cross section tuned to low volume inflation gas production.

Eventually, when combustion pressure $P_{32}$ reaches a predetermined combustion pressure $P_T$ at and above which low volume inflation gas production in gas generation chamber 32 is no longer evidenced, discharge orifice 50 is driven irreversibly into the open second condition thereof depicted in FIG. 5B. The development of predetermined combustion pressure $P_T$ in gas generation chamber 32 increases the pressure against upstream side 76 of closure portion 70 of flow control panel 62 sufficiently to urge flow control panel 62 to deform in downstream direction D in the flow of pressurized inflation gas I. This separates upstream side 76 of flow control panel 62 from downstream side 58 of bulkhead 54.

Once upstream side 76 of flow control panel 62 ceases to be in contact with downstream side 58 of bulkhead 54, closure portion 70 of flow control panel 62 no longer restricts the flow of pressurized inflation gas I through primary gas flow aperture 60 in bulkhead 54. Supplemental gas flow windows 72 in flow control panel 62 simultaneously become opened, affording passage for additional pressurized inflation gas I through control panel 62. In the open second condition of discharge orifice 50, bulkhead 54 and flow control panel 62 together present to the flow of pressurized inflation gas I in discharge passageway 34 a second effective outflow cross section that is greater than the first effective outflow cross section presented in the open first condition of discharge orifice 50.

The increase in effective outflow cross section arising in the open second condition of discharge orifice 50 reduces the back pressure communicated from discharge orifice 50 in upstream direction U through discharge passageway 34 into gas generation chamber 32. In this manner, discharge orifice 50 moderates the difference between combustion pressure $P_{32}$ arising during low volume inflation gas production and combustion pressure $P_{32}$ arising during high volume inflation gas production.

Figure 6:
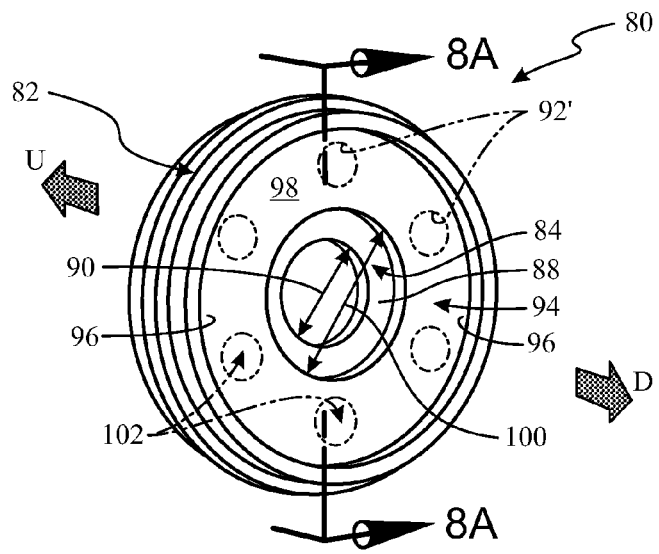
FIG. 6 is a perspective view of a third embodiment of a discharge orifice incorporating teachings of the present invention.
Figure 7:
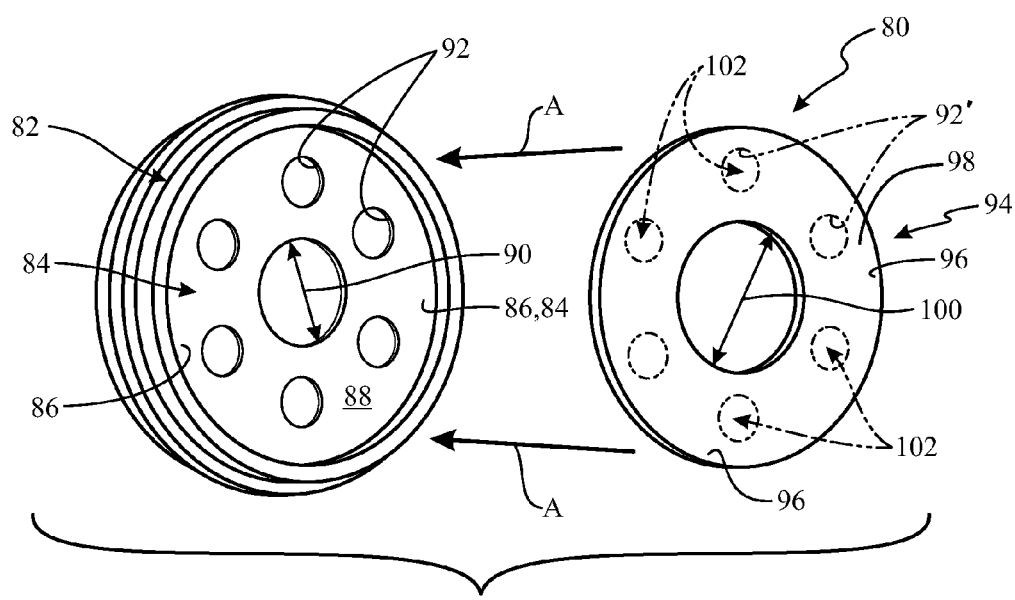
FIG. 7 is a disassembled perspective view of the discharge orifice of FIG. 6.

FIG. 6 is a perspective view of a third embodiment of a discharge orifice 80 incorporating teachings of the present invention, while FIG. 7 is a disassembled perspective view of the elements of discharge orifice 80. Upstream direction U and downstream direction D are shown by arrows. In FIGS. 6 and 7 only the downstream sides of the depicted structures are visible. The upstream sides of those structures are presented subsequently in discussing the operation of discharge orifice 80.

Discharge orifice 80 includes a continuous open frame 82 that is intended to be secured within discharge passageway 34 circumscribing the flow of pressurized inflation gas I therethrough. A rigid bulkhead 84 is secured about the periphery 86 thereof within frame 82. Bulkhead 84 has an upstream side that is directed toward gas generation chamber 32 when frame 82 with bulkhead 84 carried therein is secured in discharge passageway 34 in the manner of discharge orifice 40 in FIG. 2. Opposite therefrom, bulkhead 84 has a downstream side 88 that is visible in FIGS. 3 and 4.

A primary gas flow aperture 90 is formed through bulkhead 84 communicating between downstream side 88 and the upstream side thereof. Primary gas flow aperture as seen to best advantage in FIG. 7 is a circular opening centrally located within bulkhead 84. Nonetheless, alternative configurations are possible of a primary gas flow aperture through a bulkhead, such as bulkhead 84. As will be borne out subsequently in an exploration of the operation of discharge orifice 80, gas flow aperture 90 accommodates some flow of pressurized inflation gas I through discharge orifice 80 on all occasions.

A plurality of relatively small supplemental gas flow apertures 92 are formed through bulkhead 84 uniformly circumferentially spaced about primary gas flow aperture 90 at equal radial distances therefrom. Nonetheless, alternative configurations are possible of supplemental gas flow apertures through a bulkhead, such as bulkhead 84.

Discharge orifice 80 also includes a relatively thin, deformable flow control panel 94 that is secured by the periphery 96 thereof within frame 82. Flow control panel 94 has an upstream side that is directed toward gas generation chamber 32 when frame 82 carrying flow control panel 94 is secured in discharge passageway 34 in the manner of discharge orifice 40 in FIG. 2. Oppositely therefrom, flow control panel 94 has a downstream side 98. As suggested by assembly arrows A in FIG. 7, when flow control panel 94 is carried in frame 82, the upstream side of flow control panel 94 is adjacent to and in contact with downstream side 88 of bulkhead 84.

A primary gas flow window 100 is formed through flow control panel 94 communicating between downstream side 98 and the upstream side thereof. As illustrated in FIGS. 6 and 7, primary gas flow window 100 is a circular opening centrally formed through flow control panel 94. Nonetheless, alternative configurations are possible of a primary gas flow window through a flow control panel, such as flow control panel 94.

Primary gas flow window 100 in flow control panel 94 is larger in cross-sectional area than is primary gas flow aperture 90 in bulkhead 84. When frame 82, bulkhead 84, and flow control panel 94 are assembled as shown in FIG. 6, primary gas flow aperture 90 in bulkhead 84 and primary gas flow window 100 in flow control panel 94 are concentrically aligned. Thus, it is only through primary gas flow window 100 that downstream side 88 of bulkhead 84 is visible in FIG. 6. When flow control panel 94 and bulkhead 84 are assembled within frame 82, supplemental gas flow apertures 92 in bulkhead 84 are blocked by flow control panel 94. In that condition, flow control panel 94 includes a plurality of closure portions 102 that obscure respective of supplemental gas flow apertures 92 in bulkhead 84. The location of supplemental gas flow apertures 92 behind and in abutment with flow control panel 94 is indicated in FIGS. 6 and 7 on downstream side 98 of flow control panel as phantom primary flow control apertures 92', which accordingly define the radially outermost terminus of each respective closure portion 102 of flow control panel 94.

Figure 8A:
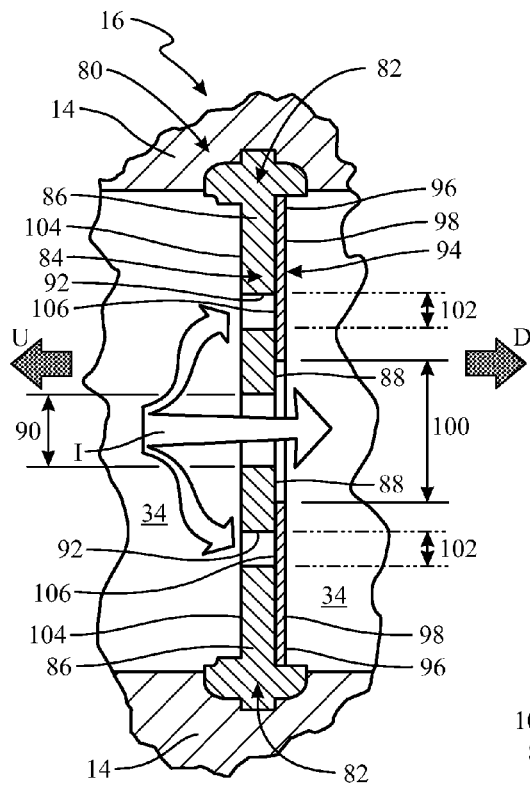
FIG. 8A is a elevation cross-sectional view of the discharge orifice of FIG. 6 taken along section line 8A-8A therein, thereby to depict the discharge orifice in an open first condition thereof wherein the discharge orifice presents to the flow of inflation gas through the discharge passageway a first effective outflow cross section tuned to low volume inflation gas production.

FIG. 8A is a cross-sectional elevation view of discharge orifice 80 from FIG. 6 disposed in discharge passageway 34 within discharge end 14 of inflator 16 in the manner of discharge orifice 40 in FIG. 2. Accordingly, FIG. 8A depicts discharge orifice 80 in an open first condition thereof in which discharge orifice 80 presents to the flow of pressurized inflation gas I through discharge passageway 34 a first effective outflow cross section that is tuned to low volume inflation gas production. Frame 82 is lodged in discharge passageway 34. Periphery 86 of bulkhead 84 and periphery 96 of flow control panel 94 are secured within frame 82 traversing the flow of pressurized inflation gas I through discharge passageway 34. Downstream side 88 of bulkhead 84 is presented through primary gas flow window 100 in flow control panel 94, while upstream side 104 of bulkhead 84 is oriented in upstream direction U, toward gas generation chamber 32.

Bulkhead 84 is disposed upstream of and in parallel face-to-face abutment with upstream side 106 of flow control panel 94. Primary gas flow window 100 in flow control panel 94 is in fluid-flow alignment with primary gas flow aperture 90 in bulkhead 84, but closure portions 102 of flow control panel 94 block the passage of pressurized inflation gas I through supplemental gas flow apertures 92 in bulkhead 84. Accordingly, in the open first condition of discharge orifice 80, primary gas flow aperture 90 in bulkhead 84 defines the first effective outflow cross section presented to the flow of pressurized inflation gas I. As combustion pressure $P_{32}$ increases, the pressure exerted on upstream side 106 of closure portions 102 of flow control panel 94 also increases.

Figure 8B:
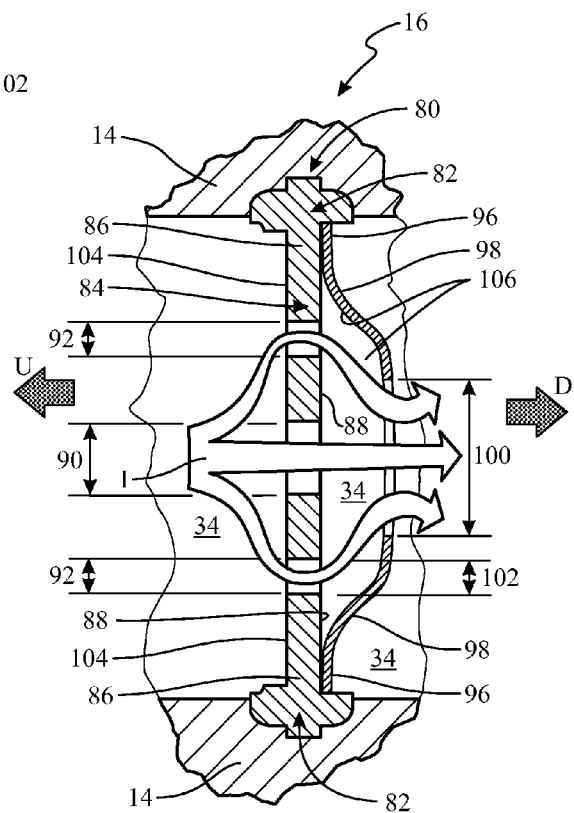
FIG. 8B is a elevation cross-sectional view of the discharge orifice of FIG. 8A in an open second condition thereof wherein the discharge orifice presents to the flow of inflation gas through the discharge passageway a second effective outflow cross section tuned to low volume inflation gas production.

Eventually, when combustion pressure $P_{32}$ reaches a predetermined combustion pressure $P_T$ at and above which low volume inflation gas production in gas generation chamber 32 is no longer evidenced, discharge orifice 80 is driven irreversibly into the open second condition thereof depicted in FIG. 8B. The development of predetermined combustion pressure $P_T$ in gas generation chamber 32 increases the pressure against upstream side 106 of closure portions 102 of flow control panel 94 sufficiently to urge flow control panel 94 to deform in downstream direction D in the flow of pressurized inflation gas I. This separates upstream side 106 of flow control panel 94 from downstream side 88 of bulkhead 84.

Once upstream side 106 of flow control panel 94 ceases to be in contact with downstream side 88 of bulkhead 54, closure portions 102 of flow control panel 94 no longer restrict the flow of pressurized inflation gas I through supplemental gas flow apertures 92 in bulkhead 84. Supplemental gas flow apertures 92 in bulkhead 84 then become opened, affording passage for additional pressurized inflation gas I through bulkhead 84. In the open condition of discharge orifice 80, bulkhead 84 and flow control panel 94 together present to the flow of pressurized inflation gas I in discharge passageway 34 a second effective outflow cross section that is greater than the first effective outflow cross section presented in the open first condition of discharge orifice 80.

The increase in effective outflow cross section arising in the open second condition of discharge orifice 80 reduces the back pressure communicated from discharge orifice 80 in upstream direction U through discharged passageway 34 into gas generation chamber 32. In this manner, discharge orifice 80 moderates the difference between combustion pressure $P_{32}$ arising during low volume inflation gas production and combustion pressure $P_{32}$ arising during high volume inflation gas production.

Figure 9:
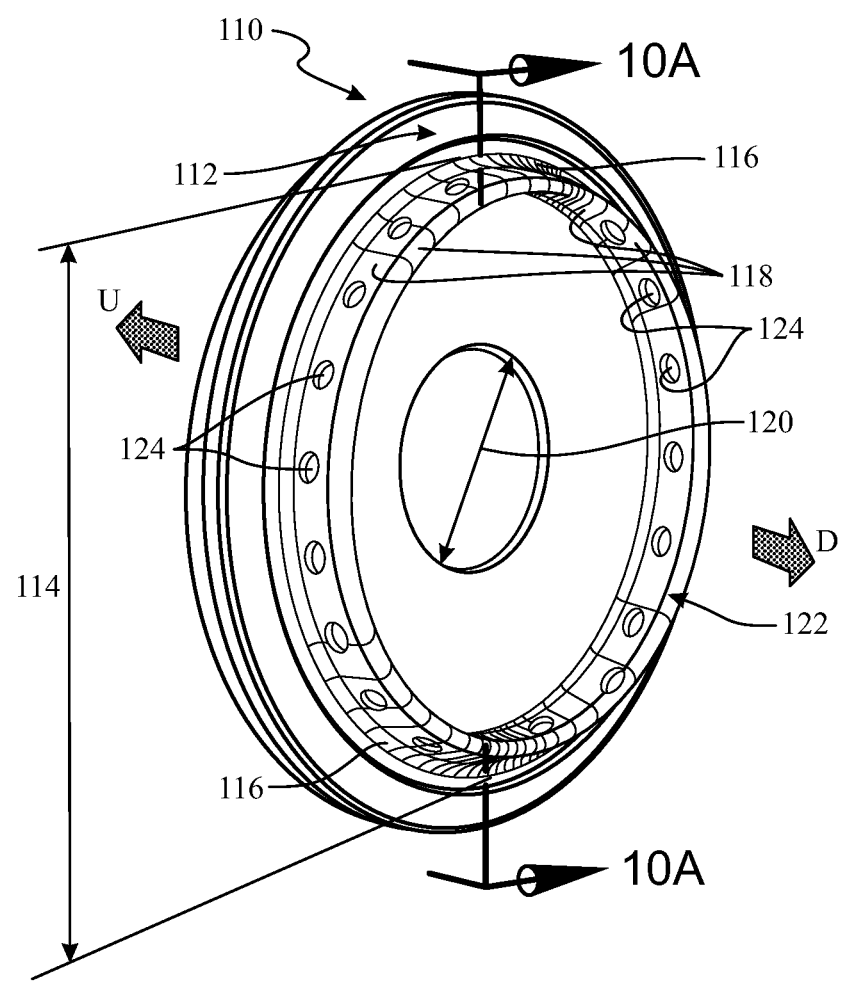
FIG. 9 is a perspective view of a fourth embodiment of a discharge orifice incorporating teachings of the present invention.

FIG. 9 is a perspective view of a fourth embodiment of a discharge orifice 110 incorporating teachings of the present invention. Upstream direction U and downstream direction D are shown by arrows, and only the downstream sides of the depicted structures are visible. The upstream sides of those structures are presented subsequently in discussing the operation of discharge orifice 110.

Discharge orifice 110 includes a continuous open frame 112 that is intended to be secured within discharge passageway 34 circumscribing the flow of pressurized inflation gas I therethrough. A deformable flow control panel 114 is secured by the periphery 116 thereof within frame 112. Flow control panel 114 has an upstream side that is directed toward gas generation chamber 32 when frame 112 carrying flow control panel 114 is secured in discharge passageway 34 in the manner of discharge orifice 40 in FIG. 2. Oppositely therefrom, flow control panel 114 has a downstream side 118.

A primary gas flow window 120 is formed through flow control panel 114 communicating between downstream side 118 and the upstream side thereof. As illustrated in FIG. 9, primary gas flow window 120 is a circular opening centrally formed through flow control panel 114. Nonetheless alternative configurations are possible of a primary gas flow window through a flow control panel, such as flow control panel 114.

Flow control panel 114 includes a folded region 122 wherein the upstream side of flow control panel is crimped into engagement with itself, causing folded region 122 to project in downstream direction D from downstream side 118 of flow control panel 114. A plurality of supplemental gas flow windows 124 are formed through folded region 122 of flow control panel 114. Supplemental gas flow windows 124 are so positioned within flow control panel 114 as to be obscured by the upstream side of flow control panel 114 when folded region 122 is crimped as shown in FIG. 9. There, folded region 122 of flow control panel 114 assumes the form of a continuous circular structure upstanding from downstream side 118 of flow control panel 114 that is concentrically disposed relative to primary gas flow window 120. Primary gas flow window 120 affords passage of some pressurized inflation gas I through discharge orifice 110 in all circumstances.

Figures 10A, 10B:
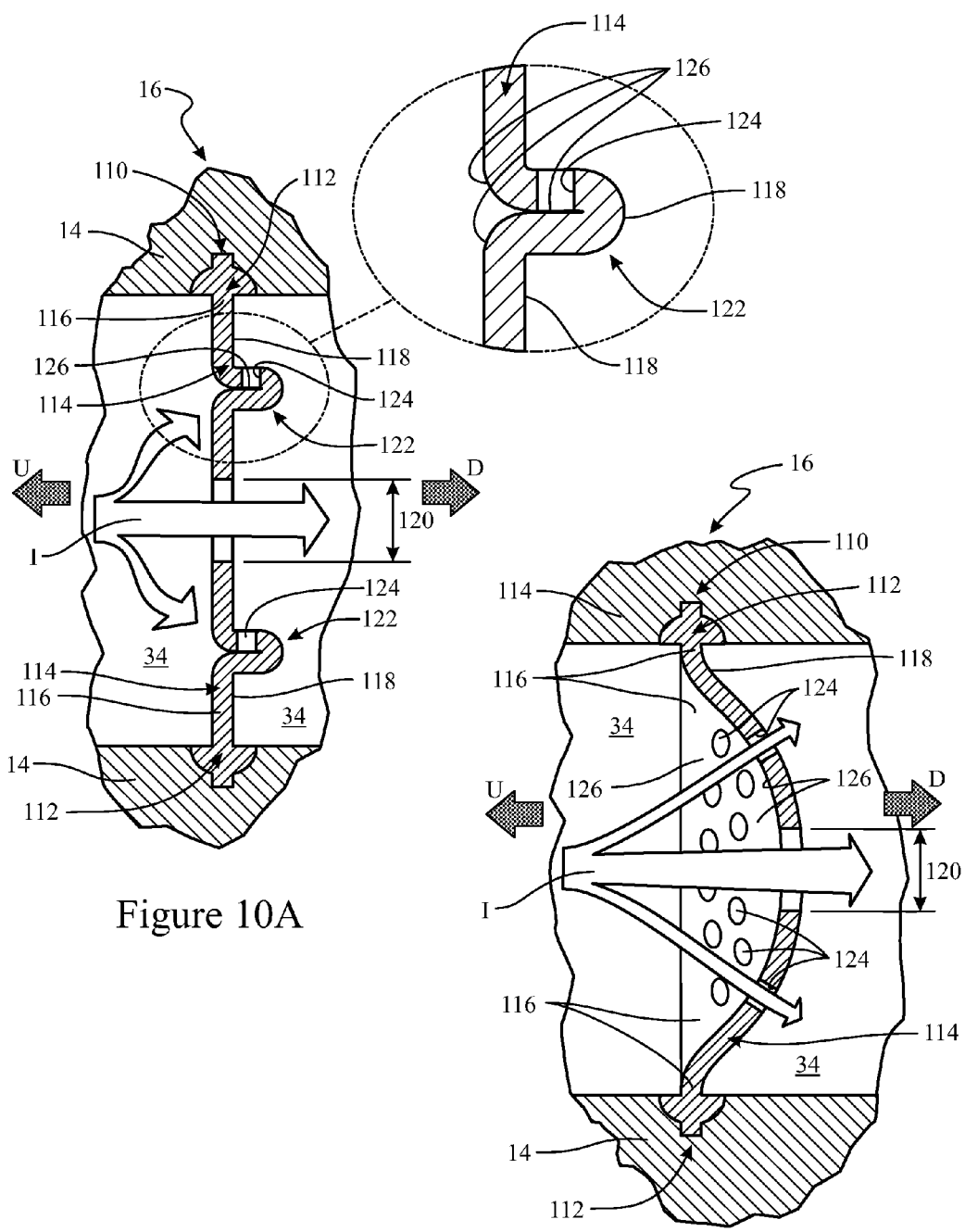
FIG. 10A is a elevation cross-sectional view of the discharge orifice of FIG. 9 taken along section line 10A-10A therein, thereby to depict the discharge orifice in an open first condition thereof wherein the discharge orifice presents to the flow of inflation gas through the discharge passageway a first effective outflow cross section tuned to low volume inflation gas production.
FIG. 10B is a elevation cross-sectional view of the discharge orifice of FIG. 10A in an open second condition thereof wherein the discharge orifice presents to the flow of inflation gas through the discharge passageway a second effective outflow cross section tuned to low volume inflation gas production.

FIG. 10A is a cross-sectional elevation view of discharge orifice 110 of FIG. 9 disposed in discharge passageway 34 within discharge end 14 of inflator 16 in the manner of discharge orifice 40 in FIG. 2. Accordingly, FIG. 10A depicts discharge orifice 110 in an open first condition thereof in which discharge orifice 110 presents to the flow of pressurized inflation gas I through discharge passageway 34 a first effective outflow cross section that is tuned to low volume inflation gas production. Frame 112 is lodged in discharge passageway 34, and periphery 116 of flow control panel 114 is secured within the frame 112 traversing the flow of pressurized inflation gas I through discharge passageway 34. Accordingly, in the open first condition of discharge orifice 110, primary gas flow window 120 in flow control panel 114 defines the first effective outflow cross section presented to the flow of pressurized inflation gas I. As combustion pressure $P_{32}$ increases, the pressure exerted on the upstream side 126 of flow control panel 114 also increases.

Eventually, when combustion pressure $P_{32}$ reaches a predetermined combustion pressure $P_T$ at and above which low volume inflation gas production is no longer evidenced in combustion chamber 32, discharge orifice 110 is driven irreversibly into the open second condition thereof depicted in FIG. 10B. The development of predetermined combustion pressure $P_T$ in gas generation chamber 32 increases the pressure against upstream side 126 of flow control panel 114 sufficiently to urge flow control panel 114 to deform in downstream direction D in the flow of pressurized inflation gas I. This uncrimps folded region 122 and opens supplemental gas flow windows 124 to the downstream flow of additional pressurized inflation gas I. In the open second condition of discharge orifice 110, primary gas flow window 120 and supplemental gas flow windows 124 together present to the flow of pressurized inflation gas I in discharge passageway 34 a second effective outflow cross section that is greater than the first effective outflow cross section presented in the open first condition of discharge orifice 110.

The increase in effective outflow cross section arising in the open second condition of discharge orifice 110 reduces the back pressure communicated from discharge orifice 110 in upstream direction U through discharge passageway 34 into gas generation chamber 32. In this manner discharge orifice 110 moderates the difference between combustion pressure $P_{32}$ arising during low volume inflation gas production and combustion pressure $P_{32}$ arising during high volume inflation gas production. Although FIG. 10A shows gas flow windows 124 extending through just one side of the crimped folded region 122, in yet other embodiments, the gas flow windows 124 may be configured differently such as extending fully through the crimped folded region 122 so that additional effective outflow can be provided.

The subject invention also includes methods for moderating the difference between the combustion pressure in the gas generation chamber of a vehicle safety air bag inflator during low volume inflation gas production and the combustion pressure in the gas generation chamber during high volume inflation gas production.

Figure 11:
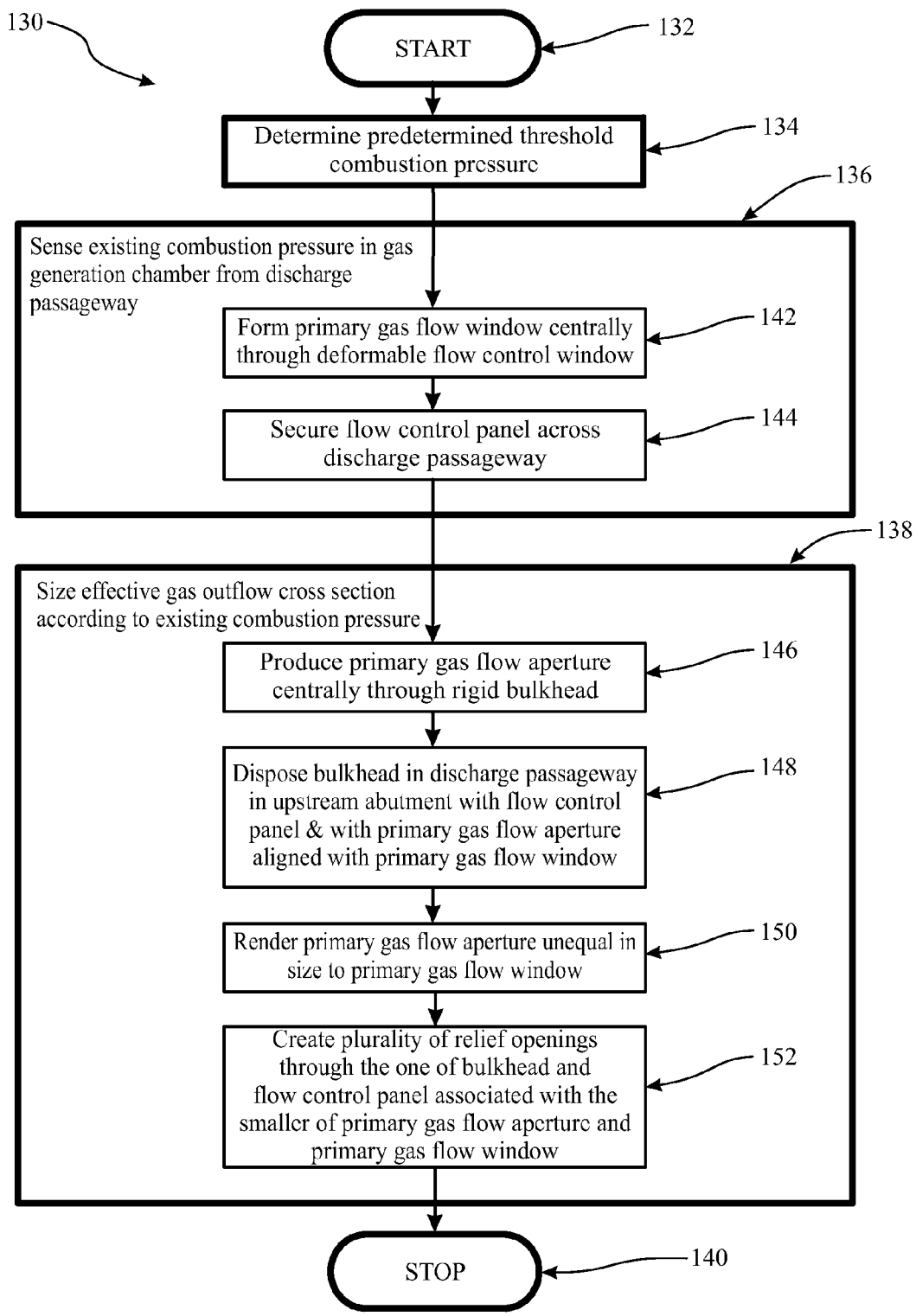
FIG. 11 is a flowchart of steps in a method incorporating teachings of the present invention by which to moderate the difference between the combustion pressure in the gas generation chamber of a vehicle safety airbag inflator during low volume inflation gas production and the combustion pressure in the gas generation chamber during high volume inflation gas production.

A first embodiment of such a method 130 is illustrated in FIG. 11. From an initiation oval 132, method 130 proceeds to the step indicated in instruction rectangle 134 of determining a predetermined threshold combustion pressure $P_T$ above which combustion pressure $P_{32}$ arising in a gas generation chamber ceases to correspond to low volume inflation gas production. Broadly thereafter, method 130 involves sensing the combustion pressure $P_{32}$ in the gas generation chamber from a location in the discharge passageway, as indicated in subroutine rectangle 136, and, as indicated in subroutine rectangle 138, sizing the effective gas outflow cross section of the discharge passageway in a manner that is adaptive to a specific threshold change in combustion pressure $P_{32}$. When combustion pressure $P_{32}$ is less than predetermined threshold combustion pressure $P_T$, the flow of inflation gas I through the discharge passageway is presented with a first effective gas outflow cross section that is tuned to low volume inflation gas I production in the gas generation chamber. On the other hand, when combustion pressure $P_{32}$ is greater than or equal to predetermined threshold combustion pressure $P_T$, the flow of inflation gas I in the discharge passageway is presented with a second effective outflow cross section that is greater than the first effective outflow cross section and that is tuned to high volume inflation gas production in the gas generation chamber. Method 30 concludes at termination oval 140.

Sensing combustion pressure $P_{32}$ as called for in subroutine rectangle 136 is conducted from a location in the discharge passageway, first by forming centrally through a deformable, substantially planar flow control panel a primary gas flow window, as indicated in instruction rectangle 142, and then by securing the flow control panel across the discharge passageway, as indicated in instruction rectangle 144. The flow control panel employed in subroutine rectangle 136 is so constructed as to be deformable downstream within the flow of the pressurized inflation gas I in the discharge passageway during high volume inflation gas production in the gas generation chamber.

Sizing the effective gas outflow cross section of the discharge passageway in the manner called for in subroutine rectangle 138 is performed, first by producing centrally through a rigid bulkhead a primary gas flow aperture, as indicated in instruction rectangle 146. Thereafter, as indicated in instruction rectangle 148, the bulkhead is disposed in a discharge passageway upstream of and in parallel face-to-face abutment with the flow control panel utilized in subroutine rectangle 136. The primary gas flow aperture in the bulkhead is in this step placed in fluid-flow alignment with the primary gas flow window of the flow control panel. As indicated in instruction rectangle 150, the primary gas flow aperture is rendered unequal in size to the primary gas flow window. The cross-sectional area of the smaller of either, the primary gas flow aperture, or the primary gas flow window, corresponds to the first effective gas outflow cross section that is tuned to low volume inflation gas production. Finally, a plurality of supplemental gas flow openings are created through the one of the bulkhead or the flow control panel that is associated with the smaller of the primary gas flow aperture or the primary gas flow window, as indicated in instruction rectangle 152. The total of the cross-sectional areas of the plurality of supplemental gas flow openings combined with the cross-sectional area of the smaller of the primary gas flow aperture or the primary gas flow window corresponds to the second effective gas flow cross section that is tuned to high volume inflation gas production in the gas generation chamber. The method concludes at stop oval 140.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A gas discharge orifice for a vehicle safety airbag inflator, the inflator producing pressurized inflation gas for the airbag in an internal gas generation chamber, and pressurized inflation gas from the gas generation chamber flowing through a discharge passageway to the exterior of the inflator, the discharge orifice comprising:
   (a) a continuous open frame securable within the discharge passageway circumscribing the flow of inflation gas therethrough; and
   (b) an inflation gas flow control valve filling the frame, the flow control valve converting from an open first condition thereof into an open second condition thereof responsive to the development of pressure in the gas generation chamber greater than a predetermined threshold pressure, the first condition of the flow control valve presenting to the flow of inflation gas through the discharge passageway a first effective outflow cross section tuned to low volume inflation gas production being at pressure below the predetermined threshold pressure in the gas generation chamber, and the second condition of the flow control valve presenting to the flow of inflation gas in the discharge passageway a second effective outflow cross section greater than the first effective outflow cross section and tuned to high volume inflation gas production being at pressure greater than or equal to the predetermined threshold pressure in the gas generation chamber, the flow control valve thereby moderating the difference between the pressure below the predetermined threshold pressure arising in the gas generation chamber during low volume inflation gas production and the pressure greater than or equal to the predetermined threshold pressure arising in the gas generation chamber during high volume inflation gas production, wherein operation of the flow control valve from the first condition thereof into the second condition thereof is irreversible.

2. A gas discharge orifice as recited in claim 1, wherein the flow control valve comprises:
   (a) a rigid bulkhead peripherally secured to the frame, the bulkhead having an upstream side directed toward the gas generation chamber when the frame is secured in the discharge passageway and a downstream side opposite therefrom;
   (b) a primary gas flow aperture formed through the bulkhead communicating between the upstream side and the downstream side thereof, a portion of the primary gas flow aperture accommodating a flow of inflation gas through the flow control valve in both the first condition and the second condition thereof; and
   (c) a deformable flow control panel peripherally secured to the frame adjacent to and on the downstream side of the bulkhead, in the first condition of the flow control valve the control panel contacting the bulkhead with a closure portion of the control panel obscuring a portion of the primary gas flow aperture, the control panel being urged out of contact with the bulkhead into the second condition of the flow control valve by pressure exerted by inflation gas through the bulkhead against the closure portion of the control panel.

3. A gas discharge orifice as recited in claim 2, wherein the primary gas flow aperture in the bulkhead defines the second effective outflow cross section presented to the flow of inflation gas in the second condition of the flow control valve.

4. A gas discharge orifice as recited in claim 2, further comprising a primary gas flow window formed through the flow control panel, in the first condition of the flow control valve the primary gas flow window in the flow control panel overlying a portion of the primary gas flow aperture in the bulkhead.

5. A gas discharge orifice as recited in claim 4, further comprising a plurality of supplemental gas flow windows formed through the flow control panel at locations radially separated from the primary gas flow window, in the second condition of the flow control valve the supplemental gas flow windows in the flow control panel contributing to defining the second effective outflow cross section presented to the flow of inflation gas.

6. A gas discharge orifice as recited in claim 5, wherein the primary gas flow window in the flow control panel is smaller in cross section than the primary gas flow aperture in the bulkhead.

7. A gas discharge orifice as recited in claim 1, wherein the flow control valve comprises:
   (a) a rigid bulkhead peripherally secured to the frame, the bulkhead having an upstream side directed toward the gas generation chamber when the frame is secured in the discharge passageway and a downstream side opposite therefrom;

(b) a primary gas flow aperture formed through the bulkhead communicating between the upstream side and the downstream side thereof, the primary gas flow aperture accommodating a flow of inflation gas through the flow control valve in both the first condition and the second condition thereof;

(c) a relief aperture formed through the bulkhead at a location separated from the primary gas flow aperture; and (c) a deformable flow control panel peripherally secured to the frame adjacent to and on the downstream side of the bulkhead, in the first condition of the flow control valve the control panel contacting the bulkhead with a closure portion of the control panel obscuring the relief aperture, the control panel being urged out of contact with the bulkhead into the second condition of the flow control valve by pressure exerted by inflation gas through the bulkhead against the closure portion of the control panel.

8. A gas discharge orifice as recited in claim 7, wherein the primary gas flow aperture in the bulkhead defines the first effective outflow cross section presented to the flow of inflation gas in the first condition of the flow control valve.

9. A gas discharge orifice as recited in claim 7, wherein in the second condition of the flow control valve the relief aperture in the bulkhead contributes to defining the second effective outflow cross section presented to the flow of inflation gas.

10. A gas discharge orifice as recited in claim 7, further comprising a primary gas flow window formed through the flow control panel, in the first condition of the flow control valve a portion of the primary gas flow window being overlapped by the primary gas flow aperture in the bulkhead.

11. A gas discharge orifice as recited in claim 10, wherein the gas flow window in the flow control panel is larger in cross section than the primary gas flow aperture in the bulkhead.

12. A gas discharge orifice as recited in claim 1, wherein the flow control valve comprises:

(a) a deformable flow control panel peripherally secured to the frame, the flow control panel having an upstream side directed toward the gas generation chamber when the frame is secured in the discharge passageway and a downstream side opposite therefrom, in the first condition of the flow control valve the upstream side of the flow control panel being crimped into engagement with itself in a folded region of the flow control panel;

(b) a primary gas flow window formed through the flow control panel at a central location, the primary gas flow window in the flow control panel defining the first effective outflow cross section presented to the flow of inflation gas in the first condition of the flow control valve; and (c) a plurality of supplemental gas flow windows formed through the flow control panel in the folded region thereof, in the first condition of the flow control valve the supplemental gas flow windows being obscured by the crimping of the flow control panel upon itself, in the second condition of the flow control valve the control panel being urged by the pressure of inflation gas against the upstream side of the flow control panel to uncrimp the folded region of the flow control panel and open the supplemental gas flow windows.

13. A gas discharge orifice as recited in claim 12, wherein the folded region of the flow control panel is concentric with the primary gas flow window.

14. A gas discharge orifice for a vehicle safety airbag inflator, the inflator producing pressurized inflation gas for the airbag in an internal gas generation chamber, and pressurized inflation gas from the gas generation chamber flowing through a discharge passageway to the exterior of the inflator, the discharge orifice comprising:

(a) a rigid bulkhead peripherally securable across the discharge passageway, the bulkhead having an upstream side directed toward the gas generation chamber when the bulkhead is secured in the discharge passageway and a downstream side opposite therefrom;

(b) a primary gas flow aperture formed through the bulkhead communicating between the upstream side and the downstream side thereof, at least a portion of the primary gas flow aperture accommodating a flow of inflation gas through the gas discharge orifice on all occasions;

(c) a deformable flow control panel peripherally secured to the bulkhead on the downstream side thereof, the control panel contacting the bulkhead with a closure portion of the control panel obscuring inflation gas flow past the bulkhead, and the control panel being urged out of contact with the bulkhead by pressure exerted by inflation gas through the bulkhead against the closure portion of the control panel; and (d) a primary gas flow window formed through the flow control panel overlying at least a portion of the primary gas flow aperture in the bulkhead.

15. A gas discharge orifice as recited in claim 14, wherein:

(a) the primary gas flow window in the flow control panel is smaller in cross section than the primary gas flow aperture in the bulkhead; and (b) the discharge orifice further comprises a plurality of supplemental gas flow windows formed through the flow control panel at locations radially separated from the primary gas flow window.

16. A gas discharge orifice as recited in claim 14, wherein:

(a) the primary gas flow window in the flow control panel is larger in cross section than the primary gas flow aperture in the bulkhead; and (b) the discharge orifice further comprises a plurality of relief aperture formed through the bulkhead at locations radially separated from the primary gas flow aperture.

17. A method for moderating pressurized inflation gas from an gas generation chamber flowing through a discharge passageway to the exterior of an inflator, wherein the difference between the pressure in the gas generation chamber of a vehicle safety airbag inflator during low volume inflation gas production is below a predetermined threshold pressure and the pressure in the gas generation chamber during high volume inflation gas production is greater than or equal to the predetermined threshold pressure, the method comprising the steps of:

(a) determining the predetermined threshold pressure above which the pressure arising in the gas generation chamber ceases to correspond to low volume inflation gas production;

(b) sensing the existing pressure in the gas generation chamber from a location in the discharge passageway; and (c) sizing the effective gas outflow cross section of the discharge passageway as follows:

(i) when the existing pressure is less than the predetermined threshold pressure, presenting to the flow of inflation gas through the discharge passageway a first effective gas outflow cross section tuned to the low volume inflation gas production; and (ii) when the existing pressure is greater than or equal to the predetermined threshold pressure, presenting to the flow of inflation gas in the discharge passageway a second effective gas outflow cross section greater than the first effective gas outflow cross section, the second effective gas outflow cross section being tuned to the high volume inflation gas production and being irreversible once the second effective gas flow cross section is presented to the flow of inflation gas.

18. A method as recited in claim 17, wherein the step of sensing comprises the steps of:
  (a) forming centrally through a deformable substantially planar flow control panel a primary gas flow window; and
  (b) securing the flow control panel across the discharge passageway, the flow control panel being deformable downstream within the flow of inflation gas in the discharge passageway during high volume inflation gas production.

19. A method as recited in claim 18, wherein the step of sizing comprises the steps of:
  (a) producing centrally through a rigid bulkhead a primary gas flow aperture;
  (b) disposing the bulkhead in the discharge passageway upstream of and in parallel face-to-face abutment with the flow control panel and with the primary gas flow aperture of the bulkhead in fluid-flow alignment with the primary gas flow window of the flow control panel;
  (c) rendering the primary gas flow aperture unequal in size to the primary gas flow window, the cross-sectional area of the smaller of the primary gas flow aperture and the primary gas flow window corresponding to the first effective gas outflow cross section; and
  (d) creating a plurality of relief openings through the one of the bulkhead and the flow control panel associated with the smaller of the primary gas flow aperture and the primary gas flow window, the total of the cross-sectional areas of the relief openings combining with the cross-sectional area of the smaller of the primary gas flow aperture and the primary gas flow window to correspond to the second effective gas outflow cross section.

\* \* \* \* \*